United States Patent
Trainin et al.

(10) Patent No.: US 11,284,301 B2
(45) Date of Patent: Mar. 22, 2022

(54) FLOW CONTROL FOR WIRELESS DEVICES

(71) Applicant: QUALCOMM Incorporated, San Diego, CA (US)

(72) Inventors: Solomon Trainin, Haifa (IL); Ran Hay, Rosh Haaein (IL); Alecsander Petru Eitan, Haifa (IL)

(73) Assignee: QUALCOMM INCORPORATED, San Diego, CA (US)

( * ) Notice: Subject to any disclaimer, the term of this patent is extended or adjusted under 35 U.S.C. 154(b) by 349 days.

(21) Appl. No.: 15/953,115

(22) Filed: Apr. 13, 2018

(65) Prior Publication Data

US 2018/0302825 A1 Oct. 18, 2018

Related U.S. Application Data

(60) Provisional application No. 62/517,148, filed on Jun. 8, 2017, provisional application No. 62/486,412, filed on Apr. 17, 2017.

(51) Int. Cl.
*H04W 28/10* (2009.01)
*H04L 1/16* (2006.01)
(Continued)

(52) U.S. Cl.
CPC ........... *H04W 28/10* (2013.01); *H04L 1/1614* (2013.01); *H04L 1/1671* (2013.01);
(Continued)

(58) Field of Classification Search
None
See application file for complete search history.

(56) References Cited

U.S. PATENT DOCUMENTS

| 8,665,906 B1 | 3/2014 | Liu et al. |
| 8,838,855 B2 * | 9/2014 | Trainin ................. H04W 28/06 710/56 |

(Continued)

FOREIGN PATENT DOCUMENTS

| CN | 101204048 A | 6/2008 |
| JP | 2013510499 A | 3/2013 |

(Continued)

OTHER PUBLICATIONS

International Search Report and Written Opinion—PCT/US2018/027802—ISA/EPO—dated Jul. 30, 2018.

*Primary Examiner* — Jeffrey M Rutkowski
*Assistant Examiner* — Ning Li
(74) *Attorney, Agent, or Firm* — Loza & Loza, LLP

(57) ABSTRACT

Systems and methods are provided for flow control in a wireless communication system. In certain aspects, an apparatus for wireless communications comprises an interface configured to receive, from a wireless node, one or more parameters specifying a memory at the wireless node, and an indication of an amount of free memory space in the memory at the wireless node. The apparatus also comprises a processing system configured to determine a number of data units to be transmitted to the wireless node based on the indication of the amount of free memory space and the one or more parameters, wherein the interface is further configured to output data units for transmission to the wireless node, wherein a number of the data units output for transmission to the wireless node equals the determined number of data units.

25 Claims, 13 Drawing Sheets

(51) Int. Cl.
  *H04L 1/18* (2006.01)
  *H04L 12/835* (2013.01)
  *H04W 28/20* (2009.01)
  *H04L 47/30* (2022.01)

(52) U.S. Cl.
  CPC .......... *H04L 1/1835* (2013.01); *H04L 1/1867* (2013.01); *H04L 47/30* (2013.01); *H04W 28/20* (2013.01)

(56) References Cited

U.S. PATENT DOCUMENTS

| | | | |
|---|---|---|---|
| 8,843,115 B2 | 9/2014 | Amerga et al. | |
| 9,337,954 B2 | 5/2016 | Abraham et al. | |
| 9,450,711 B2 | 9/2016 | Sridhara et al. | |
| 9,736,731 B1* | 8/2017 | Liu | H04B 7/0617 |
| 2003/0135640 A1 | 7/2003 | Ho et al. | |
| 2004/0225734 A1* | 11/2004 | Schober | H04L 47/527 709/225 |
| 2009/0080456 A1* | 3/2009 | Hillyard | H04L 1/1887 370/450 |
| 2009/0292965 A1* | 11/2009 | Park | H04L 69/324 714/750 |
| 2009/0303871 A1* | 12/2009 | Kim | H04L 1/1877 370/216 |
| 2013/0039180 A1* | 2/2013 | Hong | H04L 47/26 370/231 |
| 2014/0177614 A1* | 6/2014 | Asterjadhi | H04L 1/1614 370/338 |
| 2015/0282229 A1* | 10/2015 | Vedula | H04W 12/04 370/338 |
| 2016/0007283 A1* | 1/2016 | Trainin | H04W 52/0216 370/311 |
| 2016/0295350 A1* | 10/2016 | Alanen | H04W 74/002 |
| 2016/0360509 A1* | 12/2016 | Seok | H04L 1/1685 |
| 2017/0055300 A1 | 2/2017 | Pitchaiah | |
| 2018/0007581 A1* | 1/2018 | Cariou | H04L 47/30 |

FOREIGN PATENT DOCUMENTS

| | | |
|---|---|---|
| WO | 2010008844 A1 | 1/2010 |
| WO | 2010088535 A1 | 8/2010 |
| WO | 2012015737 A1 | 2/2012 |
| WO | 2016159708 A1 | 10/2016 |
| WO | 2017033531 A1 | 3/2017 |

* cited by examiner

Buffered Memory

FIFO stile – byte/word/dword aligned

| Element ID | Length | Element ID Extension | Type of memory (FIFO/ Buffered/ Both) | Mem_Unit for Mem type = FIFO (dword) | Mem_Unit for Mem type = buffered (dword) | Buff_size for Mem type = buffered (dword) | Limit of MPDU's per buffer for Mem type = buffered (dword) |
|---|---|---|---|---|---|---|---|
| Octets: 1 | 1 | 1 | 1 | 2 | 2 | 1 | 1 |

FIG. 4

| Octets: | 2 | variable | 1 |
|---|---|---|---|
| | BlockAck Starting Sequence Control | BlockAck Bitmap | RBUFCAP |

BA Information Field

FIG. 5A

| | B0 | B1 B4 | B5 B9 | B10 | B11 | B12 B15 |
|---|---|---|---|---|---|---|
| | BA Ack Policy | BA Type | Reserved | FIFO/Buffered | Management ACK | TID INFO |
| Bits: | 1 | 4 | 5 | 1 | 1 | 4 |

BA Control Field

| Order | Information |
|---|---|
| 1 | Category |
| 2 | Block Ack Action |
| 3 | Dialog Token |
| 4 | Block Ack Parameter Set |
| 5 | Block Ack Timeout Value |
| 6 | Block Ack Starting Sequence Control |
| 7 | GCR Group Address element (optional) |
| 8 | Multi-band (optional) |
| 9 | TCLAS (optional) |
| 10 | ADDBA Extension (optional) |
| 11 | EDMG Flow Control Extension Configuration |

| Order | Information |
|---|---|
| 1 | Category |
| 2 | Block Ack Action |
| 3 | Dialog Token |
| 4 | Status Code |
| 5 | Block Ack Parameter Set |
| 6 | Block Ack Timeout Value |
| 7 | GCR Group Address element (optional) |
| 8 | Multi-band (optional) |
| 9 | TCLAS (optional) |
| 10 | ADDBA Extension (optional) |
| 11 | EDMG Flow Control Extension Configuration |

| Element ID | Length | Element ID extension | RBUFCAP | Advanced Recipient Memory length exponent | Optional subelements |
|---|---|---|---|---|---|
| 1 | 1 | 1 | 1 | 1 | Variable |

| Element ID | Length | Recipient memory capabilities |
|---|---|---|
| 1 | 1 | 1 |

Octets

| B0 | B1 | B2 | B3 | B4 | B5   B7 |
|---|---|---|---|---|---|
| RBUFCAP quantity capable | Advanced Recipient Memory length capable | Recipient Memory Multiple Buffer Units capable | TID Grouping capable | Memory config tag capable | Reserved |
| 1 | 1 | 1 | 1 | 1 | 3 |

Bits

FIG. 10B

| Element ID | Length | Memory config tag | RBUF_Unit_Size | Recipient Memory Multiple Buffer Units | | | TID grouping | | | | | | | | | | | | | | | | |
|---|---|---|---|---|---|---|---|---|---|---|---|---|---|---|---|---|---|---|---|---|---|---|---|
| | | | | Mem_Unit_Size | Max MPDU_per_MemUnit | Mult_Buff_MPDU | TID/TSID | | | | | | | | | | | | | | | | |
| | | | | | | | 0 | 1 | 2 | 3 | 4 | 5 | 6 | 7 | 8 | 9 | 10 | 11 | 12 | 13 | 14 | 15 |
| Octets 1 | 1 | 1 | 2 | 2 | 1 | 1 | 2 | | | | | | | | | | | | | | | |

FIG. 11

FLOW CONTROL FOR WIRELESS DEVICES

RELATED APPLICATION

This application claims priority under 35 U.S.C. § 119(e) to U.S. Provisional Application No. 62/486,412 filed on Apr. 17, 2017, and U.S. Provisional Application No. 62/517,148 filed on Jun. 8, 2017, the entire specifications of which are incorporated herein by reference.

FIELD

Certain aspects of the present disclosure generally relate to wireless communications and, more particularly, to flow control in a wireless communications system.

BACKGROUND

In order to address the issue of increasing bandwidth requirements demanded for wireless communications systems, different schemes are being developed. In some schemes, data is wirelessly transmitted at high data rates over one or more channels in the 60 GHz range.

SUMMARY

A first aspect relates to an apparatus for wireless communications. The apparatus comprises an interface configured to receive, from a wireless node, one or more parameters specifying a memory at the wireless node, and an indication of an amount of free memory space in the memory at the wireless node. The apparatus also comprises a processing system configured to determine a number of data units to be transmitted to the wireless node based on the indication of the amount of free memory space and the one or more parameters. The interface is further configured to output data units for transmission to the wireless node, wherein a number of the data units output for transmission to the wireless node equals the determined number of data units.

A second aspect relates a method for wireless communications. The method comprises receiving, from a wireless node, one or more parameters specifying a memory at the wireless node, receiving, from the wireless node, an indication of an amount of free memory space in the memory at the wireless node, determining a number of data units to be transmitted to the wireless node based on the indication of the amount of free memory space and the one or more parameters, and outputting data units for transmission to the wireless node, wherein a number of the data units output for transmission to the wireless node equals the determined number of data units.

A third aspect relates to an apparatus for wireless communications. The apparatus comprises means for receiving, from a wireless node, one or more parameters specifying a memory at the wireless node, means for receiving, from the wireless node, an indication of an amount of free memory space in the memory at the wireless node, means for determining a number of data units to be transmitted to the wireless node based on the indication of the amount of free memory space and the one or more parameters, and means for outputting data units for transmission to the wireless node, wherein a number of the data units output for transmission to the wireless node equals the determined number of data units.

A fourth aspect relates to a computer readable medium. The computer readable medium comprises instructions stored thereon for receiving, from a wireless node, one or more parameters specifying a memory at the wireless node, receiving, from the wireless node, an indication of an amount of free memory space in the memory at the wireless node, determining a number of data units to be transmitted to the wireless node based on the indication of the amount of free memory space and the one or more parameters, and outputting data units for transmission to the wireless node, wherein a number of the data units output for transmission to the wireless node equals the determined number of data units.

A fifth aspect relates to a wireless node. The wireless node comprises a receiver configured to receive, from another wireless node, one or more parameters specifying a memory at the other wireless node, and an indication of an amount of free memory space in the memory at the other wireless node. The wireless node also comprises a processing system configured to determine a number of data units to be transmitted to the other wireless node based on the indication of the amount of free memory space and the one or more parameters. The wireless node further comprises a transmitter configured to transmit data units to the other wireless node, wherein a number of the data units transmitted to the other wireless node equals the determined number of data units.

A sixth aspect relates to an apparatus for wireless communications. The apparatus includes an interface configured to output one or more parameters for transmission to a wireless node, the one or more parameters specifying a memory. The apparatus also comprises a processing system configured to compute an amount of free memory space in the memory. The interface is further configured to output an indication of the amount of free memory space for transmission to the wireless node.

A seventh aspect relates to a method for wireless communications. The method comprises outputting one or more parameters for transmission to a wireless node, the one or more parameters specifying a memory, computing an amount of free memory space in the memory, and outputting an indication of the amount of free memory space for transmission to the wireless node.

An eighth aspect relates to an apparatus for wireless communications. The apparatus comprises means for outputting one or more parameters for transmission to a wireless node, the one or more parameters specifying a memory, means for computing an amount of free memory space in the memory, and means for outputting an indication of the amount of free memory space for transmission to the wireless node.

A ninth aspect relates to a computer readable medium. The computer readable medium comprises instructions stored thereon for outputting one or more parameters for transmission to a wireless node, the one or more parameters specifying a memory, computing an amount of free memory space in the memory, and outputting an indication of the amount of free memory space for transmission to the wireless node.

A tenth aspect relates to a wireless node. The wireless node comprises a transmitter configured to transmit one or more parameters to another wireless node, the one or more parameters specifying a memory. The wireless node also comprises a processing system configured to compute an amount of free memory space in the memory. The transmitter is further configured to transmit an indication of the amount of free memory space to the other wireless node.

BRIEF DESCRIPTION OF THE DRAWINGS

FIG. 4 illustrates an example of an information element for communicating memory parameters in accordance with certain aspects of the present disclosure.

FIG. 5A illustrates an example of a block acknowledgement (BA) information field including a receiver buffer capacity (RBUFCAP) field in accordance with certain aspects of the present disclosure.

FIG. 5B illustrates an example of a BA control field including an indication of whether FIFO or Buffered memory is used in accordance with certain aspects of the present disclosure.

FIG. 8A illustrates an example add block acknowledgement (ADDBA) request frame in accordance with certain aspects of the present disclosure.

FIG. 8B illustrates an example add block acknowledgement (ADDBA) response frame in accordance with certain aspects of the present disclosure.

FIG. 9 illustrates an example flow control extension configuration element in accordance with certain aspects of the present disclosure.

FIGS. 10A and 10B illustrate an example flow control capabilities subelement, in accordance with certain aspects of the present disclosure.

FIG. 11 illustrates an example recipient memory configuration subelement, in accordance with certain aspects of the present disclosure.

DETAILED DESCRIPTION

Figure 1:
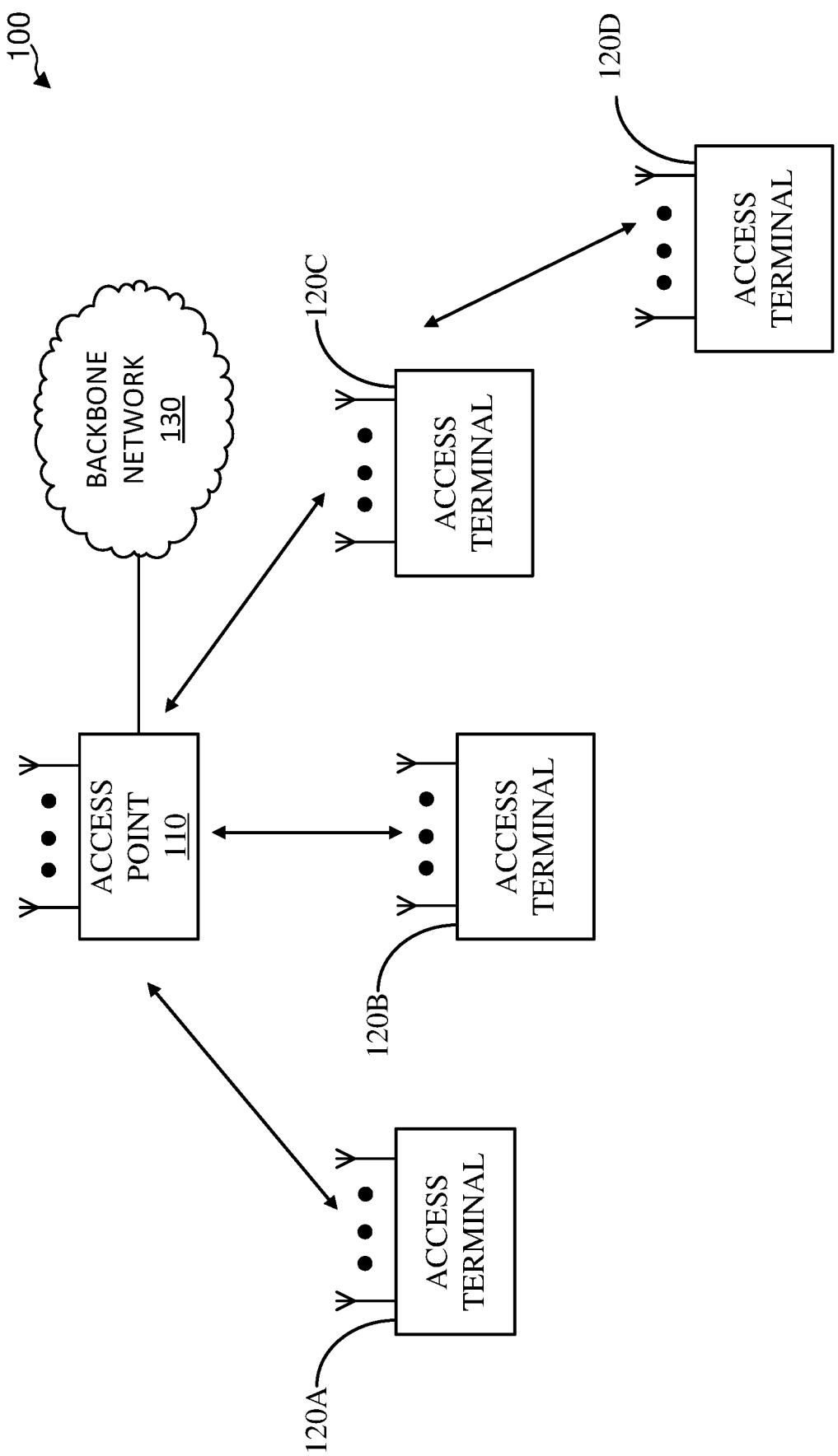
FIG. 1 illustrates an exemplary wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple access terminals. A TDMA system may allow multiple access terminals to share the same frequency channel by dividing the transmission signal into different time slots, each time slot being assigned to different access terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

With reference to the following description, it shall be understood that not only communications between access points and user devices are allowed, but also direct (e.g., peer-to-peer) communications between respective user devices are allowed. Furthermore, a device (e.g., an access point or user device) may change its behavior between a user device and an access point according to various conditions. Also, one physical device may play multiple roles: user device and access point, multiple user devices, multiple access points, for example, on different channels, different time slots, or both.

FIG. 1 illustrates an example of a wireless communication system 100 with access points and access terminals. For simplicity, only one access point 110 is shown in FIG. 1. An access point is generally a fixed station that communicates with the access terminals and may also be referred to as a base station or some other terminology. An access terminal may be fixed or mobile and may also be referred to as a mobile station, a wireless device or some other terminology. Access point 110 may communicate with one or more access terminals 120 at any given moment on the downlink and uplink. The downlink (i.e., forward link) is the communication link from the access point to the access terminals, and the uplink (i.e., reverse link) is the communication link from the access terminals to the access point. An access terminal may also communicate peer-to-peer with another access terminal. The access point 110 may be coupled to a backbone network 130 (e.g., the Internet) to provide the access terminals with access to the backbone network 130.

Figure 2:
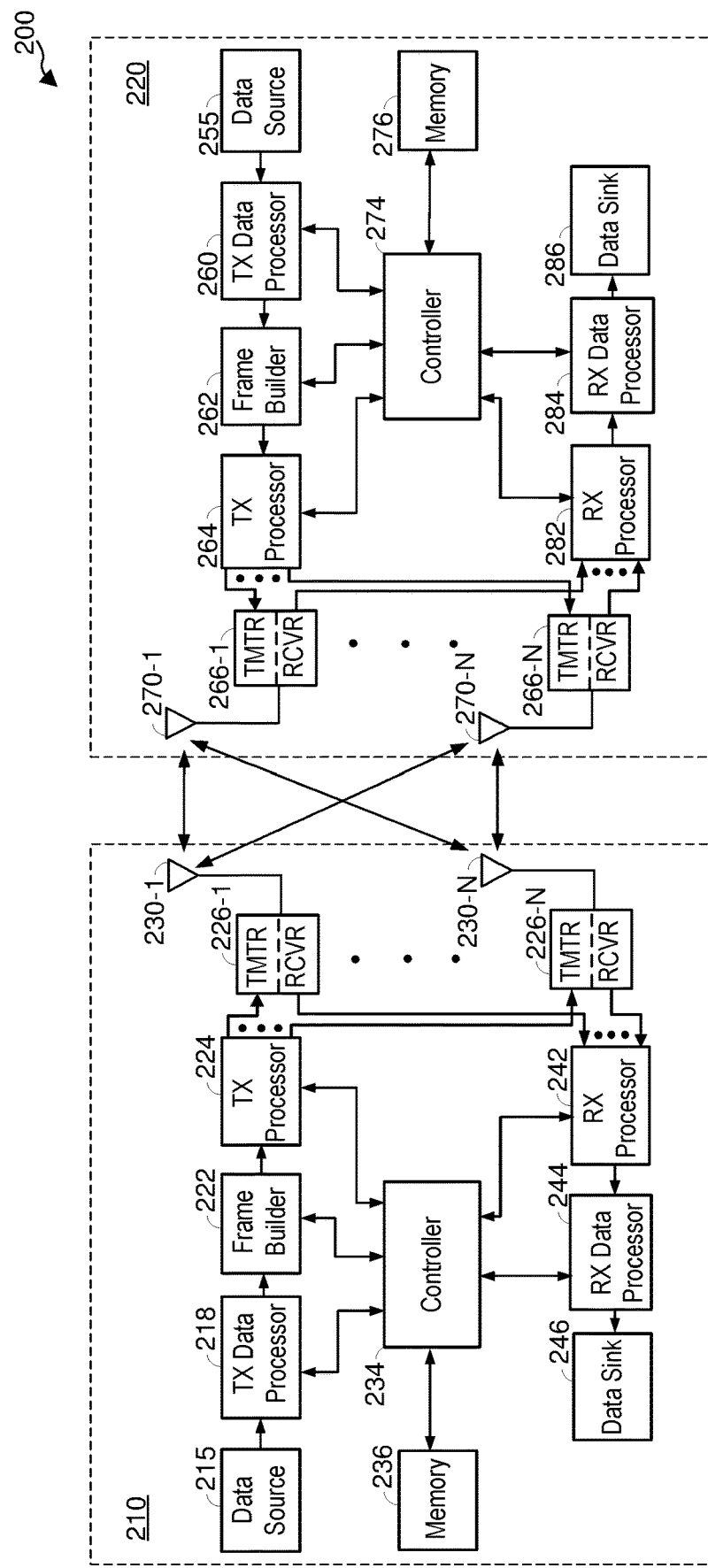
FIG. 2 is a block diagram of an exemplary access point and access terminal in accordance with certain aspects of the present disclosure.

FIG. 2 illustrates a block diagram of an access point 210 (generally, a first wireless node) and an access terminal 220 (generally, a second wireless node) of the wireless communication system 200. The access point 210 is a transmitting entity for the downlink and a receiving entity for the uplink. The access terminal 220 is a transmitting entity for the uplink and a receiving entity for the downlink. As used herein, a "transmitting entity" is an independently operated apparatus or wireless node capable of transmitting data via a wireless channel, and a "receiving entity" is an independently operated apparatus or wireless node capable of receiving data via a wireless channel.

Although, in this example, wireless node 210 is an access point and wireless node 220 is an access terminal, it shall be understood that the wireless node 210 may alternatively be an access terminal, and wireless node 220 may alternatively be an access point. The wireless node 210 may be used to implement the access point 110 in FIG. 1, and the wireless node 220 may be used to implement any one of the access terminals 120 in FIG. 1.

For transmitting data, the access point 210 comprises a transmit data processor 218, a frame builder 222, a transmit processor 224, a plurality of transceivers 226-1 to 226-N, and a plurality of antennas 230-1 to 230-N. The access point 210 also comprises a controller 234 configured to control operations of the access point 210, as discussed further below.

In operation, the transmit data processor 218 receives data (e.g., data bits) from a data source 215, and processes the data for transmission. For example, the transmit data processor 218 may encode the data (e.g., data bits) into encoded data, and modulate the encoded data into data symbols. The transmit data processor 218 may support different modulation and coding schemes (MCSs). For example, the transmit data processor 218 may encode the data (e.g., using low-density parity check (LDPC) encoding) at any one of a plurality of different coding rates. Also, the transmit data processor 218 may modulate the encoded data using any one of a plurality of different modulation schemes, including, but not limited to, BPSK, QPSK, 16QAM, 64QAM, 64APSK, 128APSK, 256QAM, and 256APSK.

In certain aspects, the controller 234 may send a command to the transmit data processor 218 specifying which modulation and coding scheme (MCS) to use (e.g., based on channel conditions of the downlink), and the transmit data processor 218 may encode and modulate data from the data source 215 according to the specified MCS. It is to be appreciated that the transmit data processor 218 may perform additional processing on the data such as data scrambling, and/or other processing. The transmit data processor 218 outputs the data symbols to the frame builder 222.

The frame builder 222 constructs a frame (also referred to as a packet), and inserts the data symbols into a data payload of the frame. Exemplary frame structures or formats are discussed further below. The frame builder 222 outputs the frame to the transmit processor 224. The transmit processor 224 processes the frame for transmission on the downlink. For example, the transmit processor 224 may support different transmission modes such as an orthogonal frequency-division multiplexing (OFDM) transmission mode and a single-carrier (SC) transmission mode. In this example, the controller 234 may send a command to the transmit processor 224 specifying which transmission mode to use, and the transmit processor 224 may process the frame for transmission according to the specified transmission mode.

In certain aspects, the transmit processor 224 may support multiple-output-multiple-input (MIMO) transmission. In these aspects, the access point 210 includes multiple antennas 230-1 to 230-N and multiple transceivers 226-1 to 226-N (e.g., one for each antenna). The transmit processor 224 may perform spatial processing on the incoming frames and provide a plurality of transmit frame streams for the plurality of antennas. The transceivers 226-1 to 226-N receive and process (e.g., convert to analog, amplify, filter, and frequency upconvert) the respective transmit frame streams to generate transmit signals for transmission via the antennas 230-1 to 230-N.

For transmitting data, the access terminal 220 comprises a transmit data processor 260, a frame builder 262, a transmit processor 264, a plurality of transceivers 266-1 to 266-N, and a plurality of antennas 270-1 to 270-N. The access terminal 220 may transmit data to the access point 210 on the uplink, and/or transmit data to another access terminal (e.g., for peer-to-peer communication). The access terminal 220 also comprises a controller 274 configured to control operations of the access terminal 220, as discussed further below.

In operation, the transmit data processor 260 receives data (e.g., data bits) from a data source 255, and processes (e.g., encodes and modulates) the data for transmission. The transmit data processor 260 may support different MCSs. For example, the transmit data processor 260 may encode the data (e.g., using LDPC encoding) at any one of a plurality of different coding rates, and modulate the encoded data using any one of a plurality of different modulation schemes, including, but not limited to, BPSK, QPSK, 16QAM, 64QAM, 64APSK, 128APSK, 256QAM, and 256APSK. In certain aspects, the controller 274 may send a command to the transmit data processor 260 specifying which MCS to use (e.g., based on channel conditions of the uplink), and the transmit data processor 260 may encode and modulate data from the data source 255 according to the specified MCS. It is to be appreciated that the transmit data processor 260 may perform additional processing on the data. The transmit data processor 260 outputs the data symbols to the frame builder 262.

The frame builder 262 constructs a frame, and inserts the received data symbols into a data payload of the frame. Exemplary frame structures or formats are discussed further below. The frame builder 262 outputs the frame to the transmit processor 264. The transmit processor 264 processes the frame for transmission. For example, the transmit processor 264 may support different transmission modes such as an OFDM transmission mode and an SC transmission mode. In this example, the controller 274 may send a command to the transmit processor 264 specifying which transmission mode to use, and the transmit processor 264 may process the frame for transmission according to the specified transmission mode.

In certain aspects, the transmit processor 264 may support multiple-output-multiple-input (MIMO) transmission. In these aspects, the access terminal 220 includes multiple antennas 270-1 to 270-N and multiple transceivers 266-1 to 266-N (e.g., one for each antenna). The transmit processor 264 may perform spatial processing on the incoming frame and provide a plurality of transmit frame streams for the plurality of antennas. The transceivers 266-1 to 266-N receive and process (e.g., convert to analog, amplify, filter, and frequency upconvert) the respective transmit frame streams to generate transmit signals for transmission via the antennas 270-1 to 270-N.

For receiving data, the access point 210 comprises a receive processor 242, and a receive data processor 244. In operation, the transceivers 226-1 to 226-N receive signals (e.g., from the access terminal 220) via the antennas 230-1 to 230-N, and process (e.g., frequency downconvert, amplify, filter and convert to digital) the received signals.

The receive processor 242 receives the outputs of the transceivers 226-1 to 226-N, and processes the outputs to recover data symbols. For example, the access point 210 may receive data (e.g., from the access terminal 220) in a frame. In this example, the receive processor 242 may detect the start of the frame using the STF sequence in the preamble of the frame. The receive processor 242 may also use the STF for automatic gain control (AGC) adjustment. The receive processor 242 may also perform channel estimation (e.g., using the CE sequence in the preamble of the frame) and perform channel equalization on the received signal based on the channel estimation.

The receive processor 242 may also recover information (e.g., MCS scheme) from the header of the frame, and send the information to the controller 234. After performing channel equalization, the receive processor 242 may recover data symbols from the frame, and output the recovered data symbols to the receive data processor 244 for further processing. It is to be appreciated that the receive processor 242 may perform other processing.

The receive data processor 244 receives the data symbols from the receive processor 242 and an indication of the corresponding MSC scheme from the controller 234. The receive data processor 244 demodulates and decodes the data symbols to recover the data according to the indicated MSC scheme, and outputs the recovered data (e.g., data bits) to a data sink 246 for storage and/or further processing.

As discussed above, the access terminal 220 may transmit data using an OFDM transmission mode or a SC transmission mode. In this case, the receive processor 242 may process the receive signal according to the selected transmission mode. Also, as discussed above, the transmit processor 264 may support multiple-output-multiple-input (MIMO) transmission. In this case, the access point 210 includes multiple antennas 230-1 to 230-N and multiple transceivers 226-1 to 226-N (e.g., one for each antenna). Each transceiver receives and processes (e.g., frequency downconverts, amplifies, filters, and converts to digital) the signal from the respective antenna. The receive processor 242 may perform spatial processing on the outputs of the transceivers 226-1 to 226-N to recover the data symbols.

For receiving data, the access terminal 220 comprises a receive processor 282, and a receive data processor 284. In operation, the transceivers 266-1 to 266-N receive signals (e.g., from the access point 210 or another access terminal) via the antennas 270-1 to 270-N, and process (e.g., frequency downconvert, amplify, filter and convert to digital) the received signals.

The receive processor 282 receives the outputs of the transceivers 266-1 to 266-N, and processes the outputs to recover data symbols. For example, the access terminal 220 may receive data (e.g., from the access point 210 or another access terminal) in a frame, as discussed above. In this example, the receive processor 282 may detect the start of the frame using the STF sequence in the preamble of the frame. The receive processor 282 may also perform channel estimation (e.g., using the CE sequence in the preamble of the frame) and perform channel equalization on the received signal based on the channel estimation.

The receive processor 282 may also recover information (e.g., MCS scheme) from the header of the frame, and send the information to the controller 274. After performing channel equalization, the receive processor 282 may recover data symbols from the frame, and output the recovered data symbols to the receive data processor 284 for further processing. It is to be appreciated that the receive processor 282 may perform other processing.

The receive data processor 284 receives the data symbols from the receive processor 282 and an indication of the corresponding MSC scheme from the controller 274. The receive data processor 284 demodulates and decodes the data symbols to recover the data according to the indicated MSC scheme, and outputs the recovered data (e.g., data bits) to a data sink 286 for storage and/or further processing.

As discussed above, the access point 210 or another access terminal may transmit data using an OFDM transmission mode or a SC transmission mode. In this case, the receive processor 282 may process the receive signal according to the selected transmission mode. Also, as discussed above, the transmit processor 224 may support multiple-output-multiple-input (MIMO) transmission. In this case, the access terminal 220 includes multiple antennas 270-1 to 270-N and multiple transceivers 266-1 to 266-N (e.g., one for each antenna). Each transceiver receives and processes (e.g., frequency downconverts, amplifies, filters, and converts to digital) the signal from the respective antenna. The receive processor 282 may perform spatial processing on the outputs of the transceivers to recover the data symbols.

As shown in FIG. 2, the access point 210 also comprises a memory 236 coupled to the controller 234. The memory 236 may store instructions that, when executed by the controller 234, cause the controller 234 to perform one or more of the operations described herein. Similarly, the access terminal 220 also comprises a memory 276 coupled to the controller 274. The memory 276 may store instructions that, when executed by the controller 274, cause the controller 274 to perform the one or more of the operations described herein.

Flow Control

Flow control is used to prevent overloading of a receiving buffer that may happen in cases where link speed is higher than the system capability to deliver, process or consume incoming data streams. This becomes more relevant with the substantial increase in throughput of new wireless links compliant with the 802.11ad and following 802.11ay standards. The existing solution of EDMG block ack with flow control is tightly coupled with block acknowledgement mechanism that limits it to control memory with buffers of predefined maximal size and keeps the control per BA agreement not allowing the control of shared memory.

Objectives of the present disclosure may include one or more of the following:
  Resolve contradiction between high wireless link speed in relation to lower bandwidth of internal bus that may result in responder memory overflow;
  Achieve high utilization of MAC memory;
  Optimize memory spent by MSDUs that are shorter than max MSDU/MTU size;
  Use existing receiver buffer capacity (RBUFCAP) of 8 bit size;
  Support maximal BA window size of 1024 buffers;
  Eliminate high link access overhead that happens when flow control sustains at short data bursts (disadvantage of current solution); and
  Provide aggregated flow control to share memory among multiple TIDs as well as per TID.

The present disclosure may be based on one or more of following observations and assumptions:
  The originator and responder operate at media access control (MAC) level in which the maximum size of a media access control (MAC) protocol data unit (MPDU) is limited but min size of MSDU is not, which can result in MPDUs of different sizes.
  BA windowing assumption that each MPDU independent of its size utilizes one constant size buffer in the reordering buffer, which leads to inefficient use of buffering memory. In many applications, pre-allocated buffers may contain more than one short MPDU.
  Amount of memory required to store number of MPDUs depends on their sizes which are unknown in advance and cannot be accurately predicted by the responder. As a result, the responder cannot inform the originator about the number of MPDUs it has memory space to store.

Aspects of the present disclosure provide one or more of the following features:
  Use of a free memory indication with no relation to BA agreement that is fed back to the originator as a measure of the responder buffer memory capacity;
  Establish reference model of responder buffering memory that originator uses to compute usable memory;
  Characterize the model with one or more configuration parameters to be communicated to the originator; and
  Establish rules of originator on how to use the configured parameters and the free memory indication to compute and control number of MPDUs to be sent to the responder.

The above features are discussed in greater detail below according to various embodiments of the present disclosure.

In certain aspects of the present disclosure, the responder (also referred to as the recipient) sends one or more memory parameters to the originator specifying a memory at the responder that will be used to buffer data units (e.g., MPDUs) from the originator at the responder. The memory may be used for reordering MPDUs received from the originator. When a sequence of MPDUs have been successfully received and properly ordered, the MPDUs may be released from the memory to a processor for further processing (at a higher layer), freeing up memory space in the memory.

In one example, the responder communicates the one or more memory parameters to the originator during a block acknowledgement (BA) negotiation between the originator and the responder. In this example, the originator may transmit an add block acknowledgement (ADDBA) request to the responder requesting a block acknowledgement (BA) session with the responder. The ADDBA request may include a traffic identifier (TID) identifying the data traffic to which the BA agreement applies. The corresponding MPDUs are part of the identified data traffic. In response, the responder transmits an ADDBA response with the one or more memory parameters to the originator.

In another example, the responder may initiate communication of the one or more memory parameters to the originator by transmitting an add traffic stream (ADDTS) request to the originator with the one or more memory parameters. In response, the originator may transmit an ADDTS response to the responder acknowledging the ADDTS request.

Figure 3A:
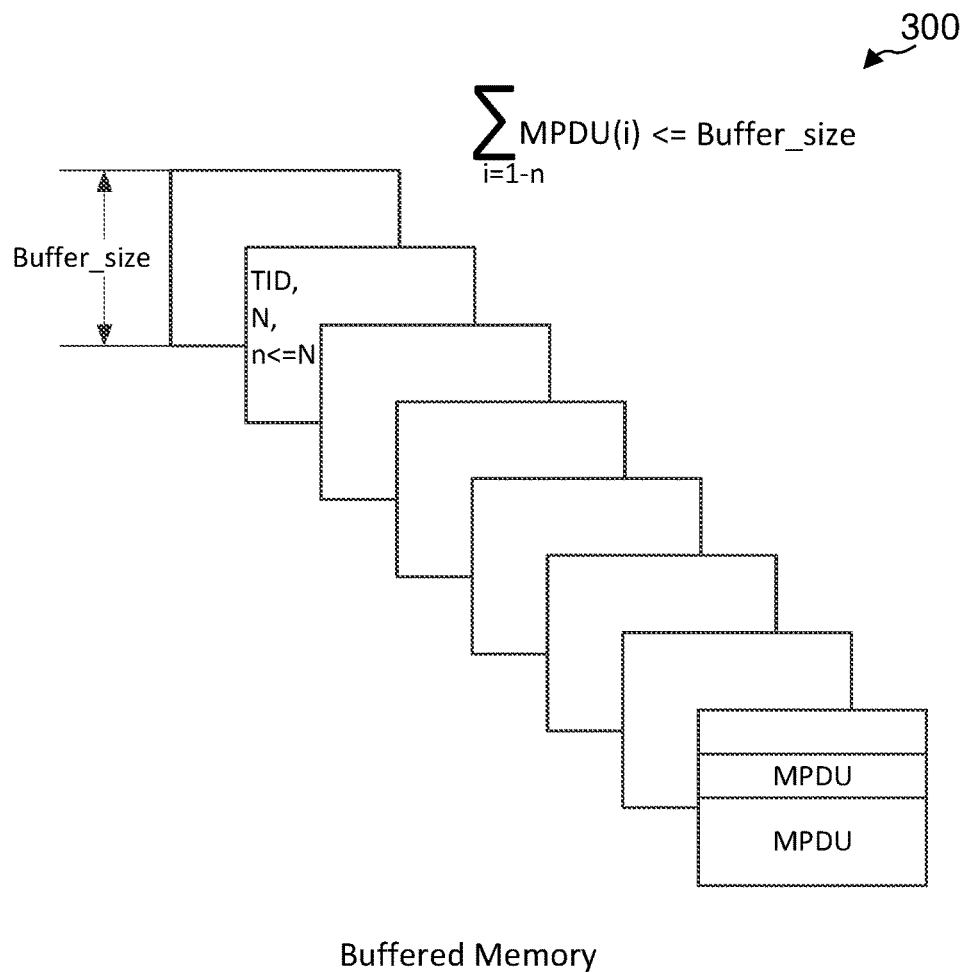
FIG. 3A illustrates an example of a Buffered memory structure in accordance with certain aspects of the present disclosure.

Embodiments of the present disclosure may support different memory types. For example, embodiments of the present disclosure may support the following two types of memory structures: Buffered and FIFO. In this regard, FIG. 3A shows an example of Buffered memory 300 in which the memory is organized into multiple buffers (i.e., plurality of buffers). Each buffer may be large enough to store an MPDU with the maximum length defined by the current standard. Each buffer may be capable of storing multiple MPDUs (e.g., multiple short MPDUs), where each MPDU is shorter than the maximum length. In certain aspects, an MPDU is non-splitting meaning that an MPDU cannot be split between two or more buffers. In other aspects, an MPDU may be split between two or more buffers. In certain aspects, the number of MPDUs that can be stored per buffer is limited to N, where N is an integer. As discussed further below, when Buffered memory is used, the responder sends one or more memory parameters to the originator describing the configuration of the Buffered memory.

Figure 3B:
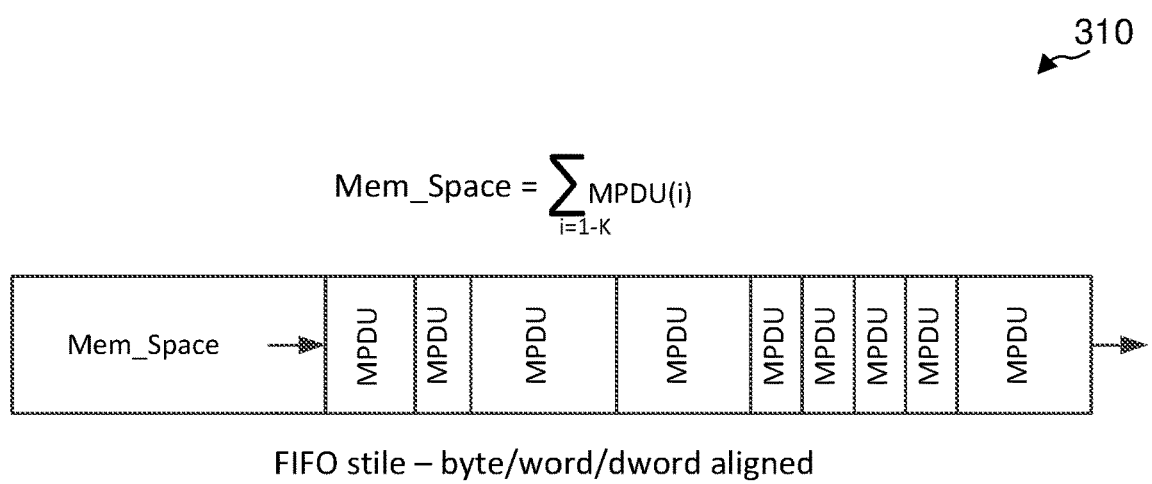
FIG. 3B illustrates an example of a FIFO memory structure in accordance with certain aspects of the present disclosure.

FIG. 3B shows an example of a first-in first-out (FIFO) memory 310. The FIFO memory 310 lacks the structure of the Buffered memory 300. In certain aspects, the number of MPDUs that can be accommodated into the FIFO memory 310 may be approximately equal to the number of MPDUs that can fit into the free space of the FIFO memory 310. In certain aspects, the FIFO memory 310 may require that the start of a MPDU be aligned with a Dword boundary of the FIFO memory 310 for regular memory addressing.

As discussed above, the responder may send one or more memory parameters to the originator in a ADDBA response or ADDTS request specifying the memory of the responder that will be used to buffer data units (MPDUs) at the responder. Table 1 below lists examples of memory parameters that the responder may send to the originator for the two types of memories discussed above (i.e., FIFO and Buffered).

TABLE 1

| Type of memory | Size of memory unit | Buffer size | Limit of MPDUs per buffer | Per TID support | |
| --- | --- | --- | --- | --- | --- |
| | | | | In ADDBA | In ADDTS |
| FIFO | Mem_Unit (Dword) | NA | NA | Yes | No |
| Buffered | Mem_Unit (Dword) | Buff_size (Dword) | N (units) | Yes | No |
| Both | Different values can apply | Per buffered | Per buffered | Per TID support can be different and negotiated as defined above | |

Mem_Unit indicates the size of one memory unit (e.g., number of bytes or words in one memory unit). As discussed further below, the responder reports the amount of free memory space in its memory in units of Mem_Unit. Thus, the originator may determine the amount of free space in the responder memory based on the value of the free memory space reported by the responder by multiplying the value with the size of one memory unit. Mem_Unit may be a configurable parameter. As shown in Table 1, Mem_Unit is a parameter for both FIFO memory and Buffered memory (e.g., the FIFO memory 310 and the Buffered memory 300). The size of the Mem_Unit used for FIFO memory and the size of the Mem_unit used for Buffered memory may be the same or different.

As discussed above, the responder may report the amount of free space in the memory in a block acknowledgement (BA) frame. In certain aspects, the responder reports the amount of free space in a receiver buffer capacity (RBUFCAP) field of a BA frame. In these aspects, Mem_Unit may be chosen such that the range of values for the amount of free memory space can fit in the RBUFCAP field, which is 8 bits in length in the current standard. In one example, Memory_Unit=(Memory_Size−Memory_Size_at_unlimited)/254. As discussed further below, Memory_Size_at_unlimited is the amount of free memory space that is enough to indicate unlimited in RBUFCAP and has enough (sufficient) space to receive A-MPDU of Maximum A-MPDU Length.

For Buffered memory (e.g., Buffered memory 300), Table 1 includes the additional memory parameters Buff_size and N. Buff_size is the size of one buffer of the Buffered memory, and N is a limit on the number of MPDUs per buffer.

When FIFO memory (e.g., FIFO memory 310) is used at the responder for buffering, the responder sends one or more memory parameters (e.g., Mem_Unit) for the FIFO memory to the originator. When Buffered memory is used at the responder for buffering, the responder sends one or more memory parameters (e.g., Mem_Unit, Buff_size and N) for the Buffered memory to the originator. In certain aspects, the responder may support both types of memory in parallel. In these aspects, the responder may send memory parameters for both types of memory to the originator, as shown in Table 1. In these aspects, the responder may signal to the originator which one of the memory types is actually being used in a block acknowledgement (BA), as discussed further below.

The memory parameters can be configured per TID in an ADDBA response since a BA agreement can be negotiated on a per TID basis. In case no support per TID is required, the memory parameters may be sent in an ADDTS request and/or in Association response by the responder.

In certain aspects, the present disclosure defines a new flow control information element (IE) for sending the one or more memory parameters from the responder to the originator. An example of the new IE 400 is shown in FIG. 4. The IE 400 represents the structure used to send the one or more memory parameters to the originator. The Element ID identifies that the IE 400 includes memory parameters, and the Length indicates the length of the IE 400. FIG. 4 shows an example of the allocation of space in the IE 400 for the different memory parameters. The IE may be delivered in a ADDBA Response frame in response to a ADDBA Request frame as part of a BA agreement negotiation. In case no support per TID is required, the IE is conveyed in a ADDTS request frame and/or in a Association response frame sent by the responder.

The responder computes the amount of free memory space in its memory for buffering, and sends the amount of free memory space in Mem_Units to the originator. The responder can compute the amount of free memory space by tracking the amount of data going into the memory, and the amount of data being released from the memory (e.g., released to a processor at the responder for further processing).

The responder can send the computed amount of free memory space in units of Mem_Units in a block acknowledgement frame. In certain aspects, the computed free memory space is sent in a RBUFCAP field of the block acknowledgement frame. In this regard, FIG. 5A shows an example of a block acknowledgement (BA) information field 500 in which the computed free memory space can be sent. The BA information field 500 is used to provide an acknowledgement for a sequence of MPDUs transmitted by the originator to the responder. The BlockAck Starting Sequence Control indicates the start of the first MPDU in the sequence, BlockAck Bitmap indicates which MPDUs in the sequence were successfully received and which MPDUs need to be retransmitted, and the RBUFCAP field indicates the receiver buffer capacity of the responder.

Table 2A list three types of indicators that can be placed in the RBUFCAP field.

TABLE 2A

| Name | Value | Meaning |
| --- | --- | --- |
| zero_space | 0 | No place in the receive memory |
| unlimited_space | 0xFF | Enough place to receive at least Maximum A-MPDU Length |
| Free Memory Space | 1-0xFe | Free memory space measured in memory units (Mem_Unit) |

A zero_space indicates that there is no space in the memory, and may be assigned a value of 0, as shown in Table 2A. Unlimited_space indicates that there is enough (sufficient) memory space to receive at least a maximum A-MPDU length, as is assigned a value of 0xFF. The maximum A-MPDU length is defined in the current standard, and is known in the art. The zero_space and unlimited_space indicators are known in the art, and used for flow control in the current standard.

It is to be appreciated that the values assigned to the zero_space and unlimited_space in Table 2A may be reversed such that the zero_space is assigned the value of 0xFF and the unlimited_space is assigned the value of 0. This example is shown in Table 2B below.

TABLE 2B

| Name | Value | Meaning |
| --- | --- | --- |
| zero_space | 0xFF | No place in the receive memory |
| unlimited_space | 0 | Enough place to receive at least Maximum A-MPDU Length |
| Free Memory Space | 1-0xFe | Free memory space measured in memory units (Mem_Unit) |

In general, the RBUFCAP has a first value to indicate no space in the memory and a second value to indicate enough space in the memory to receive a data unit of maximum length.

The present disclosure introduces a new Memory Free Space indicator in which the value of Memory Free Space indicates the computed free memory space in units of Mem_Unit. The value of Memory Free Space may be in a range of 1-0xFe, as shown in Tables 2A and 2B. The Mem_Unit may be chosen such that the range of values for Memory Free Space fits within the range of the RBUFCAP field minus two (note that two values of the RBUFCAP are reserved for zero_space and unlimited_space, and are therefore not available for Memory Free Space).

In certain aspects, the responder compares the computed free memory space with the maximum A-MPDU length. If the computed free memory space is equal to or greater than the maximum A-MPDU length, then the responder sends the unlimited_space indicator to the originator in the RBUFCAP field. If the computed free memory space is less than the maximum A-MPDU length, then the responder sends a Free Memory Space indictor to the originator in the RBUFCAP field indicating the computed free memory space in units of Mem_Units (i.e., in terms of Mem_Unit).

As discussed above, the responder may send the computed free memory space in a BA frame. The responder may send the BA frame to the originator in response to a BA request from the originator, in which case the BA frame is solicited by the originator.

The responder may also send the BA frame to the originator without receiving a BA request from the originator, in which case the BA frame is unsolicited by the originator. This is different from the current standard in which BA frames are solicited. For example, the responder may send the BA frame unsolicited when the amount of free memory space changes by a certain amount. More particularly, the responder may track the change in free memory space since the last time the free memory space was reported to the originator, and compare the change in free memory space with a threshold. If the change in free memory space is equal to or greater than the threshold, then the responder may send a BA frame with the computed free memory space to the responder unsolicited. In this case, the responder is proactive (does not wait for the originator to initiate the BA frame with a BA request).

In the case where the responder provided memory parameters for both types of memory in the ADDBA response or ADDTS request, the responder can indicate the type of memory actually being used in a BA frame. In this regard, FIG. 5B shows an example in which the BA Control Field 510 of the BA frame includes a bit indicating whether FIFO or Buffered memory is being used. As discussed further below, the originator uses the indicated type of memory to compute the number of MPDUs to transmit to the responder.

The originator uses the indication of free memory space from the responder to compute the number of MPDUs it can transmit to the responder. Since the originator knows the size of one Mem_Unit (which the responder communicated earlier to the originator), the originator can determine the amount free memory space from the indication of the amount of free memory space from the responder, which is given in units of Mem_Unit.

Because the originator knows the amount of free memory space at the responder and the sizes of the MPDUs it plans to transmit to the responder, the originator can determine the number of MPDUs it can transmit to the responder. In determining the number of MPDUs it can transmit to the response, the originator may also take into account the structure of the memory. For Buffered memory, in determining the number of MPDUs to transmit, the originator applies the restrictions placed on the allocation of MPDUs in the buffers of the Buffered memory. The restrictions may include buffer size, limit on number of MPDUs per buffer, and the fact that a MPDU cannot be split between buffers (i.e., MPDU is non-splitting). Knowledge of these restrictions allow the originator to determine the number of MPDUs the responder can accommodate in the Buffered memory, and therefore the number of MPDUs to transmit to the responder.

For FIFO memory, the originator may determine the number of MPDUs by computing the number of MPDUs that can fit into the free space of the FIFO memory. If Dword alignment applies, as discuss above, then the originator may take this into account.

In certain aspects, if the computed number of MPDUs exceeds the maximum number of MPDUs allowed per BlockAck rules, then the originator sends the maximum number of MPDUs allowed. In this case, the number of MPDUs sent by the originator shall not overflow responder's reordering memory of negotiated WinSize number of buffers (i.e., number of buffers negotiated in the BlockAck agreement). Actual number of MPDUs to be sent at each moment is not greater than WinSize and depends on number of MPDUs in the reordering memory that cannot be released to higher layer due to unsuccessful delivery of MPDU with lower sequence number.

Table 3 summarizes scenarios that demonstrates how embodiments of the present disclosure work.

TABLE 3

| Flow control Scenarios | Description |
|---|---|
| Transient | Average throughput of Internal bus is not less than average throughput of wireless link. The internal bus can be off power at time no activity. Power up latency is substantial to overload the lower MAC memory |
| Slow responder internal bus | Average throughput of Internal bus is less than average throughput of wireless link. |
| Slow responder processing | Average throughput of Internal bus is not less than average throughput of wireless link. Processing speed of buffered information is lower than average throughput of wireless link |

Figure 6:
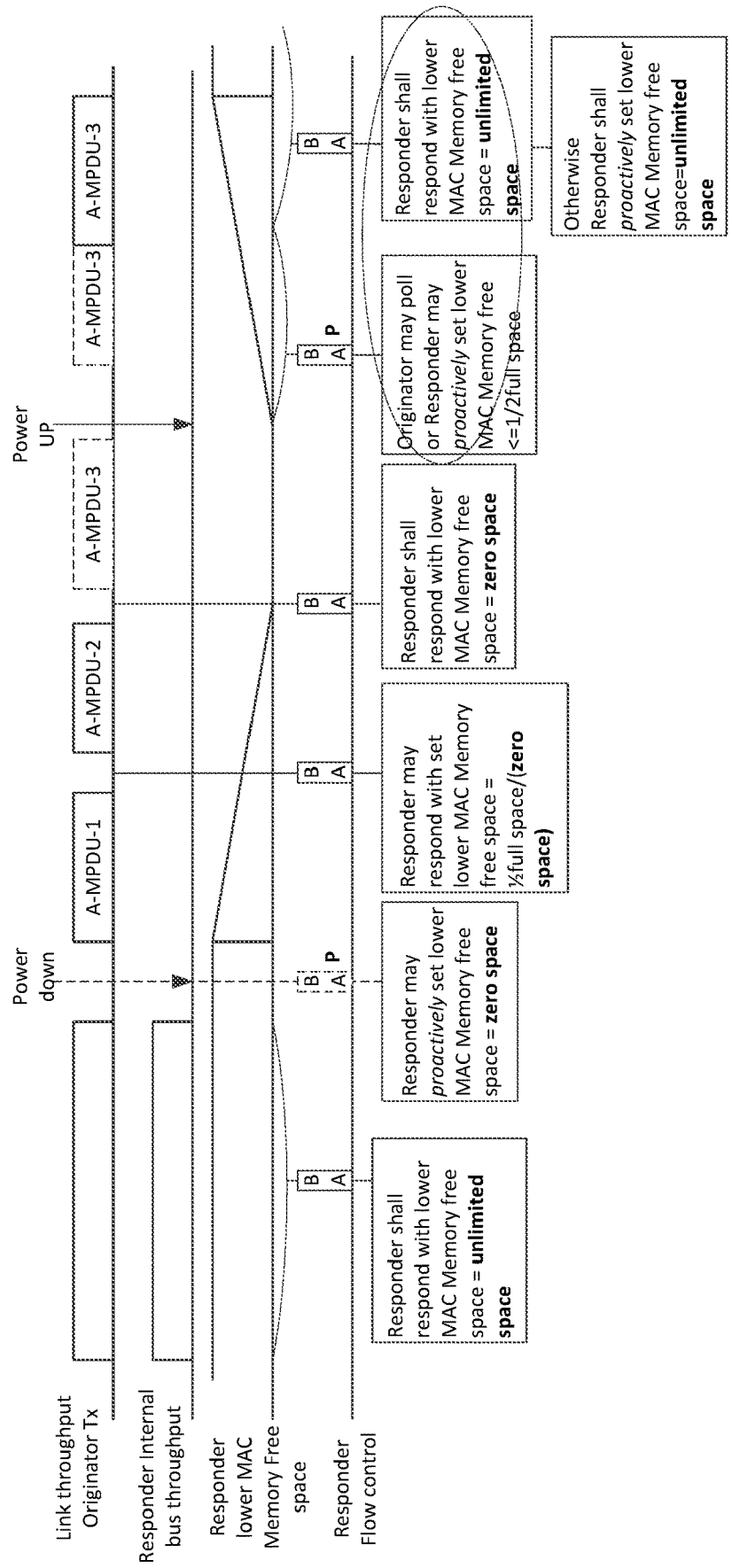
FIG. 6 illustrates a transient scenario in accordance with certain aspects of the present disclosure.

FIG. 6 illustrates a transient scenario. As seen in FIG. 6, providing indication of zero and unlimited space may be good enough to control flow in this scenario. Indication of quantity of available memory allows shorten latency and utilize the memory in case where the free memory space is lower than configured Maximum A-MPDU Length. The "P" in FIG. 6 indicates cases where the responder sends BA frame unsolicited (i.e., responder proactively sends BA frame).

Figure 7:
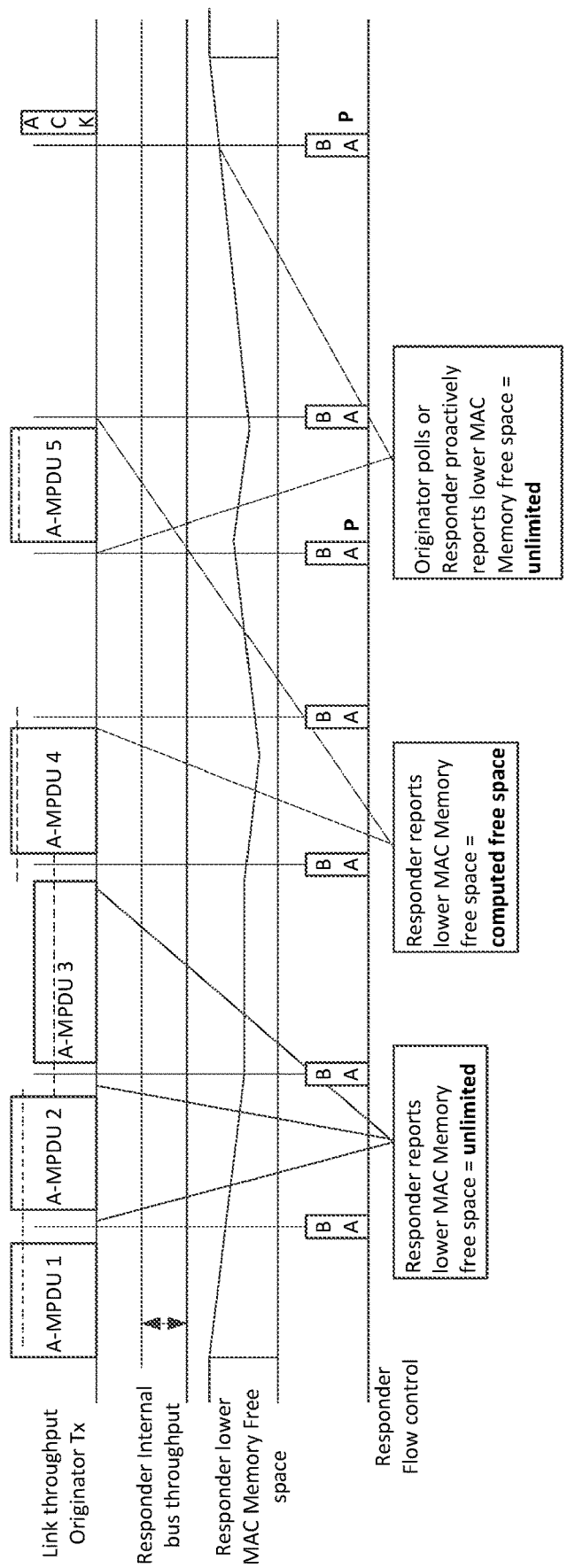
FIG. 7 illustrates a slow responder scenario in accordance with certain aspects of the present disclosure.

FIG. 7 illustrates a slow responder scenario in which computed free space is very useful when free space is smaller than Maximum A-MPDU Length. Having configuration of Maximum A-MPDU Length close to the buffer size is important to communicate long A-MPDU to keep link utilization high. Signaling of "unlimited" memory space may work in this scenario as well.

Operations of the responder according to embodiments of the present disclosure discussed above may include one or more of the following:

- In case of requesting flow control per TID, the responder provides its capabilities by adding flow control information element (e.g., FIG. 4) to ADDBA response, otherwise the responder delivers the element in association response or in ADDTS request frame.
- At time of BA responding, the responder provides indication of amount of free memory in RBUFCAP field (e.g., Table 2).
- If the responder indicates support of both types of memory in the flow control information element, the responder shall sign in the FIFO and Buffered field of BA control field (e.g., BA control field 510) type of memory that indication in RBUFCAP is related to, 0 is of memory type=FIFO and 1 belongs to memory type=Buffered.
- In case the Responder free memory space increases it can inform the originator by sending unsolicited BA. The originator shall acknowledge the BA by sending an acknowledgement. (See "P" in FIGS. 6 and 7 for illustration).

Operations of the originator according to embodiments of the present disclosure discussed above may include one or more of the following:

- Support of flow control by originator may be negotiated using originator capabilities information (not presented).
- At the time the originator receives BA from the responder, the originator computes number of MPDUs to be sent to the responder in the next BA burst or in A-MPDUs. This number is a minimum between number of MPDUs allowed to send as per BlockAck rules including retries and number (N) of MPDUs that is computed to not exceed amount of responder free buffer memory indicated in RBUFCAP of the BA.
- Originator's computing of N shall fit to responder memory type indicated in flow control IE and in BA control field (e.g., BA control field 510) if latter is relevant. In the computation, the originator shall use responder memory parameters received from the responder in the flow control IE.

The originator may be implemented with the access point 210 or access terminal 220. Similarly, the responder (also referred to as the recipient) may be implemented with the access point 210 or access terminal 220.

Additional embodiments of the present disclosure are provided below. The additional embodiments may be used in conjunction with one or more of the embodiments discussed above to facilitate flow control between the originator and the responder, as discussed further below.

Flow control address limitations of the recipient (referred to as the responder above) and increases the network and the recipient performance. The flow control feature may involve more effort from the originator than the recipient as the originator provides the flow control support for the recipient. In some cases, the recipient's capabilities may be wider than the originator's capabilities, however, the recipient may be satisfied with reduced support from the originator. Therefore, aspects of the present disclosure provide negotiations of capabilities between the originator and recipient to resolve differences between the recipient's expectations and the originator's capabilities.

In some cases, an originator may want to know the amount of free space in the recipient's memory ahead of data delivery to estimate what size of data can be delivered to the recipient. This is especially important for first access and when the free space of the recipient memory changes between accesses.

In some cases, a delayed block acknowledgement mechanism may be used that allows sending block acknowledgement frames out of data frames sequence. This allows the recipient to initiate transmission of a block acknowledgement that may convey information of the amount of free buffer space. However, the block acknowledgement may be vulnerable to spoofing attacks because the block acknowledgement is a control frame that may be difficult to protect by encryption.

Aspects of the present disclosure provide an information element structure and rules for negotiating flow control operations. For example, in certain aspects, information regarding the recipient's capabilities and flow control preferences may be conveyed to the originator device, and the originator device may indicate whether it supports all or a subset of the capabilities indicated by the recipient. Moreover, the recipient may indicate the amount of free memory space to the originator during the negotiations such that the originator may immediately start transmitting data. In certain aspects, the exchange regarding the amount of free memory space of the recipient may be initiated by the recipient device in a separate frame exchange sequence, which may be sent in a protected (e.g., encrypted) frame.

In certain aspects, the information element may include a set of parameters to characterize the memory of the recipient and to allow the originator device to modify the parameters in response, in order to indicate to the recipient which capabilities the originator can support. In some cases, the same set of agreed memory parameters may be specified per traffic identifier (TID)/traffic stream identifier (TSID) or per a set (full or partial) of TID/TSIDs. TID/TSID may identify data traffic for transmission of data units. In some cases, a few sets of memory parameters may be applied to TID/TSID and switched dynamically. In certain aspects, a recipient buffer capacity (RBUFCAP) element may be included in the information element to be delivered to the originator during the flow control setup. The RBUFCAP element indicates the amount of free memory space at the recipient device to the originator device, allowing the originator device to begin data transmissions.

In certain aspects, the recipient device may send an add block acknowledgement (ADDBA) response frame in a separate frame exchange sequence in order to initiation a block acknowledgement session. In some cases, the ADDBA response frame may be unsolicited (e.g., not in response to an ADDBA request frame). The ADDBA response frame may comprise the information element including the RBUFCAP element. In certain aspects, the ADDBA response may be an action frame that is encrypted and authenticated to protect against denial-of-service (DOS) attacks. In certain aspects, the recipient may indicate an address offset for a recirculation buffer to inform the originator device of the amount of free memory space in the recipient memory.

In certain aspects, the message including the information element may be a block acknowledgement establishment negotiation message (e.g., an add block acknowledgement (ADDBA) response frame). In certain aspects, the ADDBA response frame may be unsolicited, in which case, the ADDBA response frame may include a dialog token equal to zero.

FIGS. 8A and 8B illustrate example ADDBA request frame 800 and response frame 802, respectively, in accordance with certain aspects of the present disclosure. In certain aspects, the ADDBA request and response frames 800 and 802 may include the EDMG flow control extension configuration element. In certain aspects, the originator device may insert the flow control extension configuration element in the ADDBA request frame to indicate flow control capabilities to the recipient device. For example, an EDMG flow control capabilities subelement may be present in the EDMG flow control extension configuration element, as will be described in more detail herein. The recipient device may respond to the ADDBA request frame 800 with the ADDBA response frame 802 and include an EDMG flow control extension configuration element in the ADDBA response frame 802. The EDMG flow control capabilities subelement may be present in the EDMG flow control extension configuration element of the ADDBA response frame 802 to indicate whether the originator can support the capabilities identified in the ADDBA request frame 800. The EDMG flow control extension configuration element may include the example information element shown in FIG. 4. Another example of the EDMG flow control extension configuration element is discussed below with reference to FIG. 9.

FIG. 9 illustrates an example EDMG flow control extension configuration element 900, in accordance with certain aspects of the present disclosure. The EDMG flow control extension configuration element 900 may include an element identifier (ID), and indication of the length of the EDMG flow control extension configuration element 900, and a RBUFCAP element indicating an amount of free memory space at the recipient.

In certain aspects, the EDMG flow control extension configuration element 900 may include an advanced recipient memory length exponent (ARMLE) which indicates the amount of free space of the recipient memory at the start of a transmit opportunity (TXOP) or scheduling period (SP). In other words, there may be a delay from the time the EDMG flow control extension configuration element 900 is transmitted to the originator device and the beginning of data transmissions (e.g., during a transmit opportunity). During this time, the amount of free memory space at the recipient may change. Therefore, the ARMLE may indicate an amount of free space that the recipient guarantees will be available at the time of the data transmissions during the transmit opportunity. In certain aspects, the ARMLE may be an integer in range of zero to nine. The length defined by this subfield may be interpreted based on the following equation:

$$2^{13+ARMLE}-1 \text{ octets}$$

In certain aspects, the EDMG flow control extension configuration element 900 includes optional subelements as will be described with respect to FIGS. 10A and 10B. For example, the EDMG flow control extension configuration element 900 may include two subelements, an EDMG flow control capabilities subelement and a recipient memory configuration subelement.

FIGS. 10A and 10B illustrate an example EDMG flow control capabilities subelement 1000 that may be included the EDMG flow control extension configuration element 900, in accordance with certain aspects of the present disclosure. The EDMG flow control capabilities subelement 1000 may indicate the recipient memory capabilities 1002. As illustrated in FIG. 10B, the recipient memory capabilities 1002 may include a series of bits, each bit indicating support for a respective one of a plurality of capabilities. For example, the RBUFCAP quantity capable subfield may be set to 1 to indicate support of RBUFCAP values that indicate an amount of free memory space at the recipient. Examples of three types of indicators that can be placed in the RBUFCAP field are discussed above with reference to Tables 2A and 2B.

The ARMLE capable subfield may be set to 1 to indicate support of ARMLE that is less than the maximum aggregated media protocol data unit (A-MPDU) length exponent and may be set to 0 otherwise. The recipient memory multiple buffer units capable subfield may be set to 1 to indicate support of Mem_Unit_Size, MaxMPDU_per_MemUnit, and Mult_Buff_MPDU values, as will be described in more detail herein. The TID grouping capable subfield is set to 1 to indicate support of TID grouping values. The memory configuration tag capable subfield may be set to 1 to indicate the capability to support two memory configuration tags.

FIG. 11 illustrates an example recipient memory configuration subelement 1100, in accordance with certain aspects of the present disclosure. The memory_config_tag indicates one of two memory structures applicable for the TID/TSID that may be indicated in a ADDBA response frame. The RBUF_Unit_Size may be used as a measurement unit for the RBUFCAP to indicate the amount of free memory space available at the recipient for the originator to deliver MPDUs. For example, the recipient free memory space may be equal to RBUFCAP× RBUF_Unit_Size (dwords). Note that the RBUF_Unit_Size is referred to as Mem_Unit in Table 1.

The Mem_Unit_Size field may indicate the size of each buffer unit (in bytes) in the recipient memory. The MaxMPDU_per_MemUnit may indicate the maximal number of MPDUs that can be collected in a single buffer. Valid values for this field may be 1-0xFE, and a value equal to 0xFF may indicate that an unlimited number of MPDUs may fit in a single buffer. Note that Mem_Unit_Size and MaxMPDU_per_MemUnit are referred to as Buff_size and N, respectively, in Table 1.

The Mult_Buff_MPDU may be set to 1 to indicate that a single MPDU may be split between memory buffer units in the recipient memory. This field may not be applicable if the Mem_Unit_Size field=0. The originator device may use at least one of the fields in the recipient memory configuration subelement 1100 to determine the number of data units to transmit to the recipient device.

In certain aspects, the recipient memory configuration subelements may be transmitted in ADDBA response frame from the originator device to the recipient device during capabilities negotiations. The TID grouping field may indicate the TID/TSIDs that correspond to a TID of the ADDBA response frame. The TID grouping field indicates the TID/TSIDs that the recipient memory configuration is applicable to. For example, the RBUFCAP field delivered in the EDMG flow control extension configuration element of the ADDBA response frame and the RBUFCAP field delivered in a block acknowledgement frame may be applicable for all TID/TSID that correspond to the TID of the ADDBA response frame that includes the TID grouping. Moreover, the ARMLE field delivered in the EDMG Flow control extension configuration element of ADDBA response frame may be applicable for all TID/TSID that correspond to the TID of the ADDBA response frame the TID grouping is delivered with.

In certain aspects, a recipient memory configuration subelement may be included in the EDMG flow control extension configuration element if at least one subfield in the recipient memory capabilities field is not equal to 0 (e.g., at least one capability is supported by the recipient STA). In certain aspects, devices that established a block acknowledgement agreement, with or without exchange of EDMG Flow control extension configuration elements, may still use the RBUFCAP for flow control.

Certain aspects of the present disclosure provide negotiation rules that may be followed by devices that exchange ADDBA request and ADDBA response frames. A recipient memory capability may be supported if the corresponding subfields in the ADDBA request and in ADDBA response frames are equal to 1. In other words, a capability is supported if both the originating and recipient devices indicate support for a particular capability in the ADDBA response and request frames. In certain aspects, a recipient may respond in a ADDBA response frame with a status code indicating that the negotiations were unsuccessful if the recipient sets to 1 at least one of the subfields in the recipient memory capabilities field and the corresponding subfield in the recipient memory capabilities field of the ADDBA request frame is set to 0 or if no EDMG Flow control extension configuration element is present in the ADDBA request frame. Other status code values may be used that may be indicate that the negotiations were refused, the negotiations were refused with an unspecified reason, request declined, or invalid parameters.

In certain aspects, the ADDBA response may be a management type frame, but with an action subtype, and thus, may be robust. That is, the frame may be securely protected by encryption and authentication as part of the management frame protection of the 802.11 standard. By using the ADDBA response frame to update the RBUFCAP and ARMLE values, the RBUFCAP and ARMLE values can be communicated securely to avoid DOS and other type of attacks.

In certain aspects, a recipient may transmit a ADDBA response frame that is not in response to a ADDBA request frame to update RBUFCAP and ARMLE values. The unsolicited ADDBA response frame may be sent in a transmit opportunity that the recipient is a holder of. A dialog token of the unsolicited ADDBA response frame may be set to 0 in this case. RBUFCAP and ARMLE fields may comply with the RBUFCAP quantity and ARMLE capabilities, respectively, established for the block acknowledgement agreement. In certain aspects, after delivering the ADDBA response frame, the recipient may transmit a grant frame for the transmit opportunity to relinquish the remainder of the transmit opportunity. In some cases, after the ADDBA response frame is transmitted, the recipient may grant reverse direction to the transmit opportunity responder that is the originator of the block acknowledgement agreement.

In certain aspects, the originator that receives ADDBA response frame with dialog token set to 0 may ignore the block acknowledgement parameter set and block acknowledgement timeout value fields of the frame. Upon reception of the ADDBA response frame, the originator may update values for RBUFCAP and ARMLE to values delivered in the frame in compliancy with RBUFCAP quantity and ARMLE capabilities, respectively.

Figure 12:
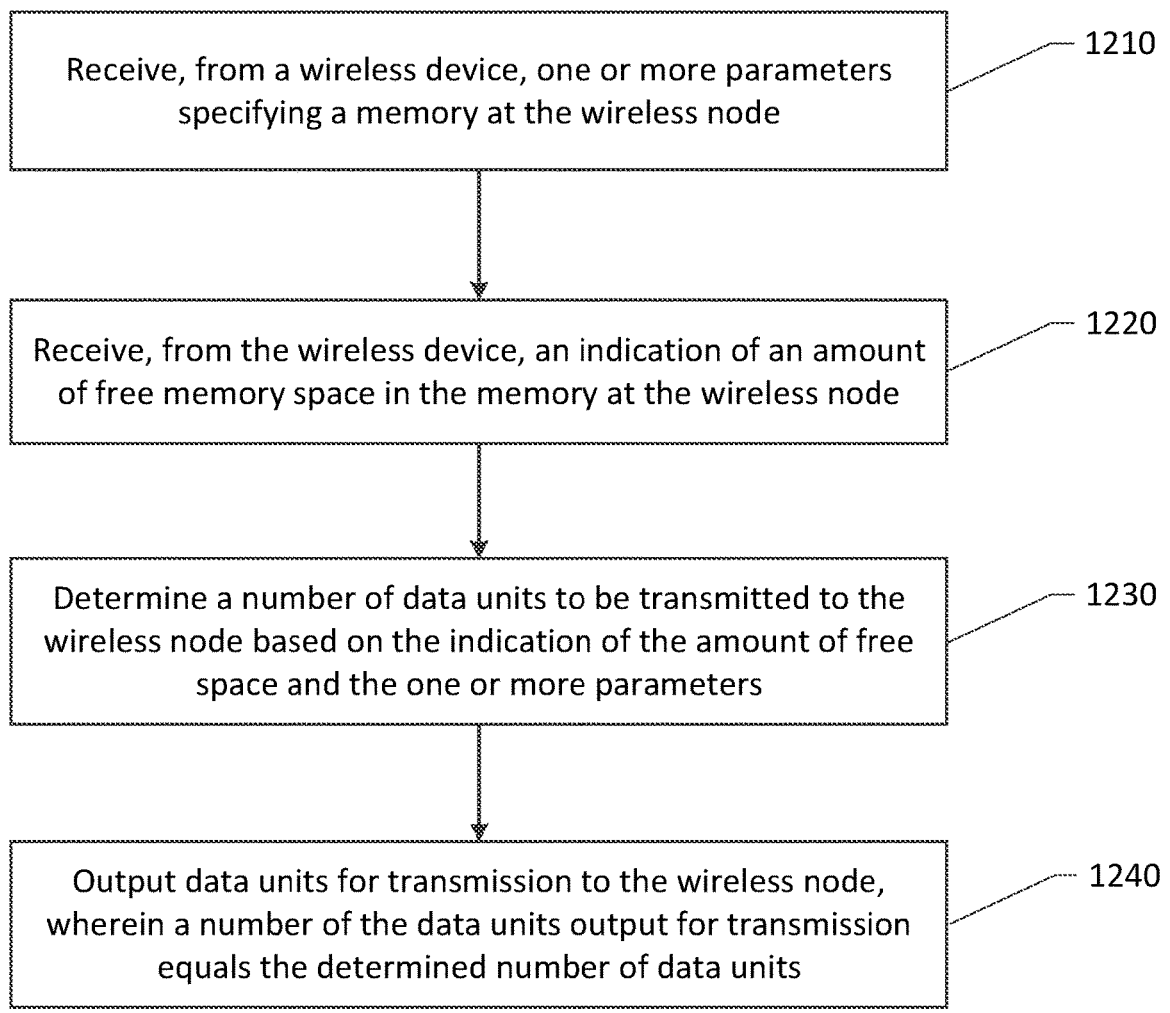
FIG. 12 is a flowchart of a method for wireless communications in accordance with certain aspects of the present disclosure.

FIG. 12 shows an exemplary method 1200 for wireless communications according to certain aspects of the present disclosure.

At step 1210, one or more parameters specifying a memory at a wireless node are received from the wireless node. The wireless node may be a responder, and the one or more parameters may include a parameter indicating a size of a memory unit.

At step 1220, an indication of an amount of free memory space in the memory at the wireless node is received from the wireless node. For example, the indication of the amount of free memory space may be given in terms of the memory unit. The indication may be received in a block acknowledgement.

At step 1230, a number of data units to be transmitted to the wireless node is determined based on the indication of the amount of free memory space and the one or more parameters.

At step 1240, data units are output for transmission to the wireless node, wherein a number of the data units output for transmission to the wireless node equals the determined number of data units. Each of the data units may comprise a MPDU.

Figure 13:
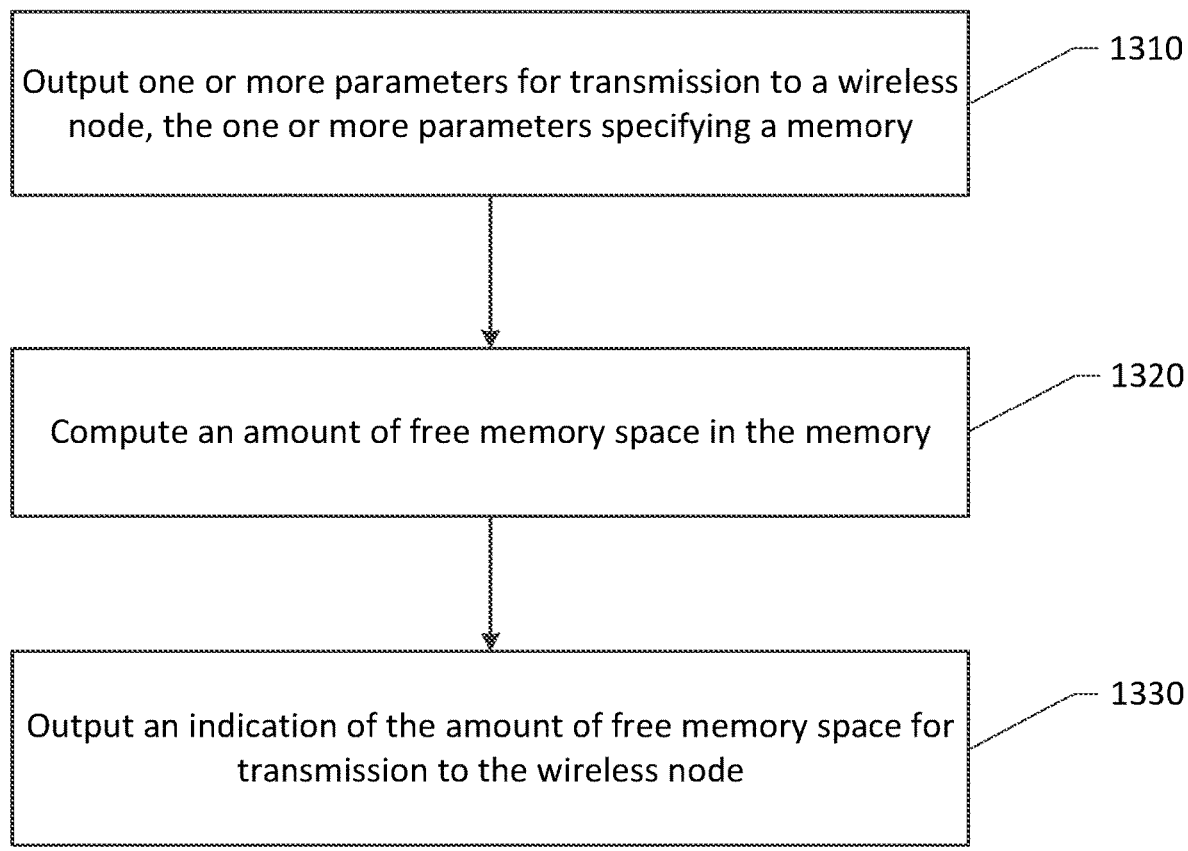
FIG. 13 is a flowchart of another method for wireless communications in accordance with certain aspects of the present disclosure.

FIG. 13 shows another exemplary method 1300 for wireless communications according to certain aspects of the present disclosure.

At step 1310, one or more parameters are output for transmission to a wireless node, the one or more parameters specifying a memory. The one or more parameters may include a parameter indicating a size of a memory unit.

At step 1320, an amount of free memory space in the memory is computed. The free memory space may be computed, for example, by tracking an amount of data going into the memory, and an amount of data being released from the memory.

At step 1330, an indication of the amount of free memory space is output for transmission to the wireless node. The indication of the amount of free memory space may be given in terms of the memory unit.

Figure 14:
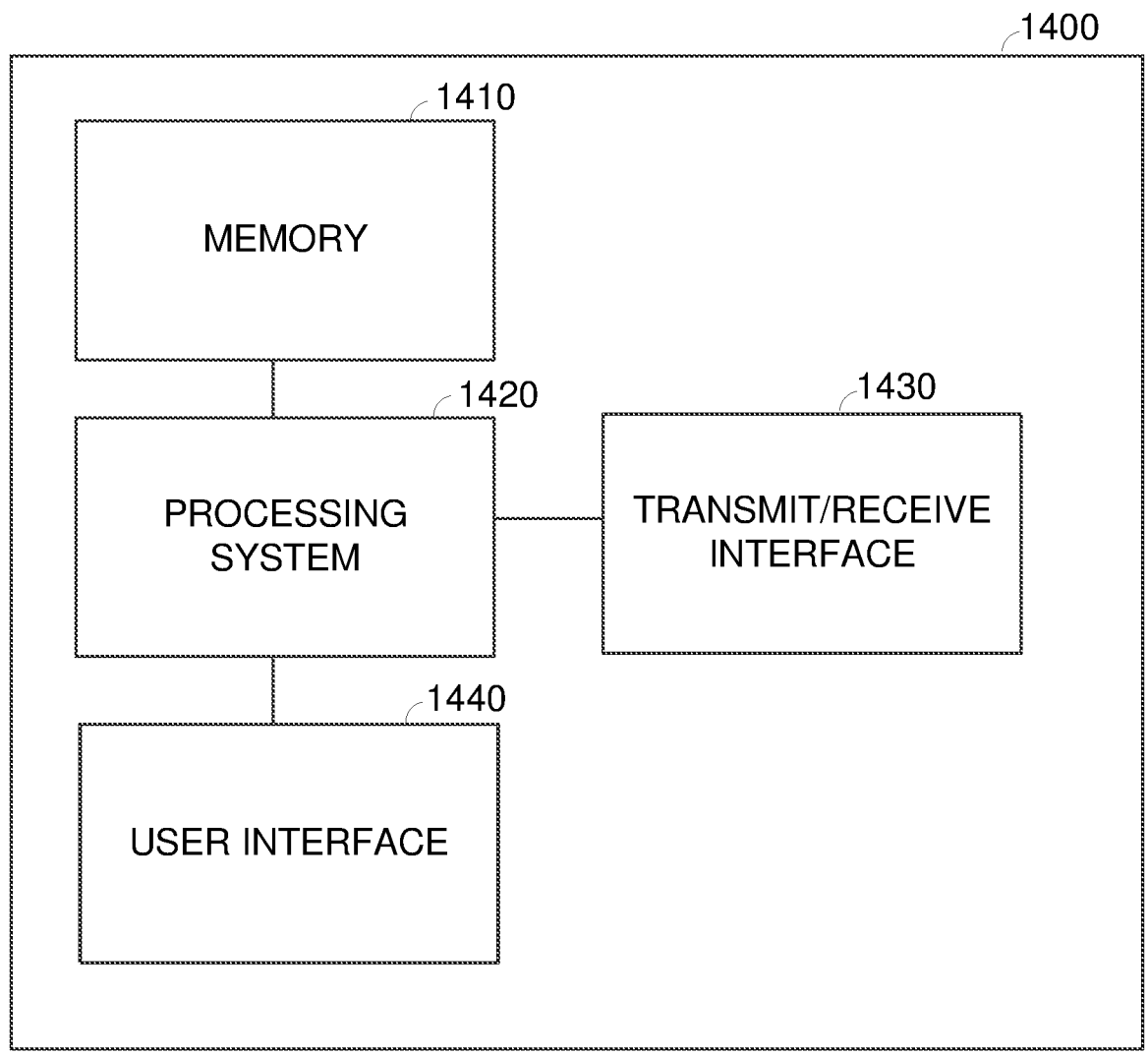
FIG. 14 illustrates an exemplary device in accordance with certain aspects of the present disclosure.

FIG. 14 illustrates an example device 1400 according to certain aspects of the present disclosure. The device 1400 may be configured to operate in a wireless device (e.g., access point 210 or access terminal 220) and to perform one or more of the operations described herein. The device 1400 may act as an originator or a responder (e.g., depending on whether the device 1400 is transmitting MPDUs or receiving MPDUs).

The device 1400 includes a processing system 1420, and a memory 1410 coupled to the processing system 1420. The memory 1410 may store instructions that, when executed by the processing system 1420, cause the processing system 1420 to perform one or more of the operations described herein. Exemplary implementations of the processing system 1420 are provided below. The device 1400 also comprises a transmit/receive interface 1430 coupled to the processing system 1420. The transmit/receive interface 1430 (e.g., interface bus) may be configured to interface the processing system 1420 to a radio frequency (RF) front end (e.g., transceivers 226-1 to 226-N or 226-1 to 266-N).

In certain aspects, the processing system 1420 may include one or more of the following: a transmit data processor (e.g., transmit data processor 218 or 260), a frame builder (e.g., frame builder 222 or 262), a transmit processor (e.g., transmit processor 224 or 264) and/or a controller (e.g., controller 234 or 274) for performing one or more of the operations described herein.

In the case of an access terminal 220, the device 1400 may include a user interface 1440 coupled to the processing system 1420. The user interface 1440 may be configured to receive data from a user (e.g., via keypad, mouse, joystick, etc.) and provide the data to the processing system 1420. The user interface 1440 may also be configured to output data from the processing system 1420 to the user (e.g., via a display, speaker, etc.). In this case, the data may undergo additional processing before being output to the user. In the case of an access point 210, the user interface 1440 may be omitted.

Examples of means for receiving, from a wireless node, one or more parameters specifying a memory at the wireless node may include at least one of the receive processor 242 or 282, the transceivers 226-1 to 226-N or 266-1 to 266-N, or the transmit/receive interface 1430. Examples of means for receiving, from the wireless node, an indication of an amount of free memory space in the memory at the wireless node may include at least one of the receive processor 242 or 282, the transceivers 226-1 to 226-N or 266-1 to 266-N, or the transmit/receive interface 1430. Examples of means for determining a number of data units to be transmitted to the wireless node based on the indication of the amount of free memory space and the one or more parameters may include at least one of the controller 234 or 274, or the processing system 1420. Examples of means for outputting data units for transmission to the wireless node, wherein a number of the data units output for transmission to the wireless node equals the determined number of data units, may include at least one of the transmit processor 224 or 264, the transceivers 226-1 to 226-N or 266-1 to 266-N, or the transmit/receive interface 1430. Examples of means for receiving a block acknowledgement that comprises the indication of the amount of free memory space may include at least one of the receive processor 242 or 282, the transceivers 226-1 to 226-N or 266-1 to 266-N, or the transmit/receive interface 1430. Examples of means for outputting a block acknowledgement request for transmission to the wireless node, wherein the block acknowledgement frame is received after the block acknowledgement request, may include at least one of the transmit processor 224 or 264, the transceivers 226-1 to 226-N or 266-1 to 266-N, or the transmit/receive interface 1430. Examples of means for outputting an add block acknowledgement (ADDBA) request for transmission to the wireless node, the ADDBA request requesting a block acknowledgement session with the wireless node, may include at least one of the transmit processor 224 or 264, the transceivers 226-1 to 226-N or 266-1 to 266-N, or the transmit/receive interface 1430. Examples of means for receiving, from the wireless node and after outputting the ADDBA request, an ADDBA response that comprises the one or more parameters, may include at least one of the receive processor 242 or 282, the transceivers 226-1 to 226-N or 266-1 to 266-N, or the transmit/receive interface 1430. Examples of means for receiving, from the wireless node, an add traffic (ADDTS) request that comprises the one or more parameters may include at least one of the receive processor 242 or 282, the transceivers 226-1 to 226-N or 266-1 to 266-N, or the transmit/receive interface 1430. Examples of means for outputting an ADDTS response for transmission to the wireless, the ADDTS response acknowledging the ADDTS request, may include at least one of the transmit processor 224 or 264, the transceivers 226-1 to 226-N or 266-1 to 266-N, or the transmit/receive interface 1430. Examples of means for receiving an indicator indicating one of the plurality of different memory types may include at least one of receive processor 242 or 282, the transceivers 226-1 to 226-N or 266-1 to 266-N, or the transmit/receive interface 1430. Examples of means for receiving a block acknowledgement that comprises the indicator indicating the one of the plurality of different memory types may include at least one of the receive processor 242 or 282, the transceivers 226-1 to 226-N or 266-1 to 266-N, or the transmit/receive interface 1430. Examples of means for receiving a plurality of traffic identifiers may include at least one of the receive processor 242 or 282, the transceivers 226-1 to 226-N or 266-1 to 266-N, or the transmit/receive interface 1430. Examples of means for receiving a capabilities element indicating one or more capabilities of the wireless node may include at least one of the receive processor 242 or 282, the transceivers 226-1 to 226-N or 266-1 to 266-N, or the transmit/receive interface 1430. Examples of means for receiving an add block acknowledgement response including a dialog token set to zero may include at least one of the receive processor 242 or 282, the transceivers 226-1 to 226-N or 266-1 to 266-N, or the transmit/receive interface 1430. Examples of means for ignoring one or more parameters of the block acknowledgement response if the dialog token is set to zero may include at least one of the controller 234 or 274, or the processing system 1420. Examples of means for receiving another indication may include at least one of the receive processor 242 or 282, the transceivers 226-1 to 226-N or 266-1 to 266-N, or the transmit/receive interface 1430.

Examples of means for outputting one or more parameters for transmission to a wireless node, the one or more parameters specifying a memory, may include at least one of the transmit processor 224 or 264, the transceivers 226-1 to 226-N or 266-1 to 266-N, or the transmit/receive interface 1430. Examples of means for computing an amount of free memory space in the memory may include at least one of the controller 234 or 274, or the processing system 1420. Example of means for outputting an indication of the amount of free memory space for transmission to the wireless node may include at least one of the transmit processor 224 or 264, the transceivers 226-1 to 226-N or 266-1 to 266-N, or the transmit/receive interface 1430. Examples of means for computing the size of the memory unit based on a size of the memory, and a range of a receiver buffer capacity (RBUFCAP) field may include at least one of the controller 234 or 274, or the processing system 1420. Examples of means for generating a block acknowledgement frame that comprises the indication of the amount of free memory space may include at least one of the controller 234 or 274, the processing system 1420, or the frame builder 222 or 262. Examples of means for outputting the block acknowledgement frame for transmission to the wireless node may include at least one of the transmit processor 224 or 264, the transceivers 226-1 to 226-N or 266-1 to 266-N, or the transmit/receive interface 1430. Examples of means for receiving a block acknowledgement request from the wireless node, wherein the block acknowledgement frame is generated in response to the block acknowledgement request, may include at least one of the receive processor 242 or 282, the transceivers 226-1 to 226-N or 266-1 to 266-N, or the transmit/receive interface 1430. Examples of means for tracking a change in the amount of free memory space in the memory and means for comparing the change with a threshold may include may include at least one of the controller 234 or 274, or the processing system 1420. Examples of means for receiving an add block acknowledgement (ADDBA) request from the wireless node, the ADDBA request requesting a block acknowledgement session with the wireless node, may include at least one of the receive processor 242 or 282, the transceivers 226-1 to 226-N or 266-1 to 266-N, or the transmit/receive interface 1430. Examples of means for generating an ADDBA response in response to the ADDBA request, wherein ADDBA response comprises the one or more parameters, may include at least one of the controller 234 or 274, the processing system 1420, or the frame builder 222 or 262. Examples of means for outputting the ADDBA response for transmission to the wireless node may include at least one of the transmit processor 224 or 264, the transceivers 226-1 to 226-N or 266-1 to 266-N, or the transmit/receive interface 1430. Examples of means for generating an add traffic (ADDTS) request that comprises the one or more parameters may include at least one of the controller 234 or 274, the processing system 1420, or the frame builder 222 or 262. Examples of means for outputting the add traffic (ADDTS) request for transmission to the wireless node may include at least one of the transmit processor 224 or 264, the transceivers 226-1 to 226-N or 266-1 to 266-N, or the transmit/receive interface 1430. Examples of means for receiving, from the wireless node, an ADDTS response acknowledging the ADDTS request, may include at least one of the receive processor 242 or 282, the transceivers 226-1 to 226-N or 266-1 to 266-N, or the transmit/receive interface 1430. Examples of means for outputting an indicator for transmission to the wireless node, the indicator indicating one of the plurality of different memory types, may include at least one of the transmit processor 224 or 264, the transceivers 226-1 to 226-N or 266-1 to 266-N, or the transmit/receive interface 1430. Examples of means for outputting a block acknowledgement for transmission to the wireless node, the block acknowledgement comprising the indicator indicating the one of the plurality of different memory types, may include at least one of the transmit processor 224 or 264, the transceivers 226-1 to 226-N or 266-1 to 266-N, or the transmit/receive interface 1430. Examples of means for outputting a plurality of traffic identifiers for transmission to the wireless node may include at least one of the transmit processor 224 or 264, the transceivers 226-1 to 226-N or 266-1 to 266-N, or the transmit/receive interface 1430. Examples of means for receiving data units from the wireless node via at least one of the identified data traffics may include at least one of the receive processor 242 or 282, the transceivers 226-1 to 226-N or 266-1 to 266-N, or the transmit/receive interface 1430. Examples of means for outputting a capabilities element for transmission to the wireless node, the capabilities element indicating one or more capabilities of the apparatus may include at least one of the transmit processor 224 or 264, the transceivers 226-1 to 226-N or 266-1 to 266-N, or the transmit/receive interface 1430. Examples of means for outputting an add block acknowledgement response for transmission to the wireless node may include at least one of the transmit processor 224 or 264, the transceivers 226-1 to 226-N or 266-1 to 266-N, or the transmit/receive interface 1430. Examples of means for outputting another indication for transmission to the wireless node may include at least one of the transmit processor 224 or 264, the transceivers 226-1 to 226-N or 266-1 to 266-N, or the transmit/receive interface 1430.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system (e.g., the processing system 1420) in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of an access terminal 220 (see FIG. 2), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by an access terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that an access terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
an interface configured to receive, from a wireless node, one or more parameters specifying a memory at the wireless node, and a block acknowledgement (BA) frame including a receiver buffer capacity (RBUFCAP) field that is configured to include an indication of an amount of computed free memory space in the memory at the wireless node when the computed free memory space is less than an amount of memory for an aggregated data unit having a maximum length, an indication of no space available in the memory at the wireless node when zero space is available in the memory, and an indication that there is sufficient space in the memory at the wireless node for the aggregated data unit having the maximum length; and
a processing system configured to determine a number of data units to be transmitted to the wireless node based on the one or more parameters specifying the memory at the wireless node, and the indication of the amount of computed free memory space when the free memory space is less than the amount of memory for the aggregated data unit having the maximum length, the indication of no space available in the memory when zero space is available in the memory, and the indication that there is sufficient space in the memory at the wireless node for the aggregated data unit having the maximum length;
wherein the interface is further configured to output data units for transmission to the wireless node, wherein a number of the data units output for transmission to the wireless node equals the determined number of data units.

2. The apparatus of claim 1, wherein the one or more parameters include a parameter indicating a size of a memory unit, and the indication of the amount of free memory space is given in terms of the memory unit.

3. The apparatus of claim 1, wherein the interface is further configured to output a block acknowledgement request for transmission to the wireless node, and the block acknowledgement frame is received after the block acknowledgement request.

4. The apparatus of claim 1, wherein the block acknowledgement frame is received unsolicited by the apparatus.

5. The apparatus of claim 1, wherein each of the data units is a media access control (MAC) protocol data unit (MPDU).

6. The apparatus of claim 1, wherein the interface is further configured to:
output an add block acknowledgement (ADDBA) request for transmission to the wireless node, the ADDBA request requesting a block acknowledgement session with the wireless node; and
receive, from the wireless node and after outputting the ADDBA request, an ADDBA response that comprises the one or more parameters.

7. The apparatus of claim 6, wherein the one or more parameters in the ADDBA response include a type of the memory in the wireless node, and a size of a memory unit used in the RBUFCAP.

8. The apparatus of claim 1, wherein the memory at the wireless node comprises a plurality of buffers, and the one or more parameters include a buffer size and a limit on a number of data units per buffer.

9. The apparatus of claim 1, wherein the memory at the wireless node comprises a plurality of buffers, and the one or more parameters include a parameter indicating whether a single data unit may be split between two or more of the plurality of buffers.

10. The apparatus of claim 1, wherein:
the interface is configured to receive a capabilities element indicating one or more capabilities of the wireless node; and
the processing system is configured to determine the number of data units to be transmitted to the wireless node based also on the one or more indicated capabilities.

11. The apparatus of claim 1, wherein:
the interface is further configured to receive an add block acknowledgement response including a dialog token set to zero when the add block acknowledgement response is not solicited by an add block acknowledgement request requesting a block acknowledgement session; and
the processing system is further configured to ignore one or more parameters of the block acknowledgement response when the dialog token is set to zero, wherein the one or more parameters are associated with the block acknowledgement session.

12. A wireless node, comprising:
a receiver configured to receive, from an other wireless node, one or more parameters specifying a memory at the other wireless node, and a block acknowledgement (BA) frame including a receiver buffer capacity (RBUFCAP) field that is configured to include an indication of an amount of computed free memory space in the memory at the other wireless node when the computed free memory space is less than an amount of memory for an aggregated data unit having a maximum length, an indication of no space available in the memory at the other wireless node when zero space is available in the memory, and an indication that there is sufficient space in the memory at the other wireless node for the aggregated data unit having the maximum length;
a processing system configured to determine a number of data units to be transmitted to the other wireless node based on the one or more parameters specifying the memory at the other wireless node, and the indication of the amount of computed free memory space when the free memory space is less than the amount of memory for the aggregated data unit having the maximum length, the indication of no space available in the memory when zero space is available in the memory, and the indication that there is sufficient space in the memory for the aggregated data unit having the maximum length; and
a transmitter configured to transmit data units to the other wireless node, wherein a number of the data units transmitted to the other wireless node equals the determined number of data units.

13. An apparatus for wireless communications, comprising:
an interface configured to output one or more parameters for transmission to a wireless node, the one or more parameters specifying a memory; and
a processing system configured to compute an amount of computed free memory space in the memory;
wherein the interface is further configured to output an indication of the amount of computed free memory space for transmission to the wireless node in a block acknowledgement (BA) frame including a receiver buffer capacity (RBUFCAP) field that is configured to include the indication of the amount of free memory space in the memory when the computed free memory space is less than an amount of memory for an aggregated data unit having a maximum length, an indication of no space available in the memory when zero space is available in the memory, and an indication that there is sufficient space in the memory for the aggregated data unit having the maximum length.

14. The apparatus of claim 13, wherein the one or more parameters include a parameter indicating a size of a memory unit, and the indication of the amount of free memory space is given in terms of the memory unit.

15. The apparatus of claim 14, wherein the processing system is configured to compute the size of the memory unit based on a size of the memory, and a range of the receiver buffer capacity (RBUFCAP) field.

16. The apparatus of claim 13, wherein:
the interface is further configured to receive a block acknowledgement request from the wireless node; and
the processing system is further configured to generate the block acknowledgement frame in response to the block acknowledgement request.

17. The apparatus of claim 13, wherein the processing system is configured to generate the block acknowledgement frame unsolicited by the wireless node.

18. The apparatus of claim 13, wherein:
the interface is further configured to receive an add block acknowledgement (ADDBA) request from the wireless node, the ADDBA request requesting a block acknowledgement session with the wireless node;
the processing system is further configured to generate an ADDBA response in response to the ADDBA request, wherein the ADDBA response comprises the one or more parameters; and
the interface is further configured to output the ADDBA response for transmission to the wireless node.

19. The apparatus of claim 18, wherein the one or more parameters in the ADDBA response include a type of the memory in the wireless node, and a size of a memory unit used in the RBUFCAP.

20. The apparatus of claim 13, wherein the processing system is configured to compute the amount of free memory space by tracking an amount of data going into the memory and an amount of data being released from the memory.

21. The apparatus of claim 13, wherein the memory comprises a plurality of buffers, and the one or more parameters include a buffer size and a limit on a number of data units per buffer.

22. The apparatus of claim 13, wherein the memory comprises a plurality of buffers, and the one or more parameters include a parameter indicating whether a single data unit may be split between two or more of the plurality of buffers.

23. The apparatus of claim 13, wherein the interface is further configured to output a capabilities element for transmission to the wireless node, the capabilities element indicating one or more capabilities of the apparatus.

24. The apparatus of claim 13, wherein the interface is further configured to output an add block acknowledgement response for transmission to the wireless node, the add block acknowledgement response including a dialog token set to zero when the add block acknowledgement response is not solicited by an add block acknowledgement request requesting a block acknowledgement session.

25. The apparatus of claim 13, further comprising a transmitter configured to transmit the one or more parameters to the wireless node, wherein the apparatus is configured as another wireless node.

* * * * *